(12) United States Patent
Quinones

(10) Patent No.: US 10,935,156 B2
(45) Date of Patent: Mar. 2, 2021

(54) FLUID CONTROL VALVE SYSTEM AND DEVICE FOR INTERMITTENTLY STOPPING FLUID FLOW

(71) Applicant: CANTOK INTERNATIONAL INC., San Marcos, CA (US)

(72) Inventor: Horatio Quinones, San Marcos, CA (US)

( * ) Notice: Subject to any disclaimer, the term of this patent is extended or adjusted under 35 U.S.C. 154(b) by 108 days.

(21) Appl. No.: 16/272,812

(22) Filed: Feb. 11, 2019

(65) Prior Publication Data
US 2020/0256480 A1 Aug. 13, 2020

(51) Int. Cl.
*F16K 31/56* (2006.01)
*F16K 21/16* (2006.01)
*F16K 31/04* (2006.01)

(52) U.S. Cl.
CPC ............ *F16K 31/566* (2013.01); *F16K 21/16* (2013.01); *F16K 31/047* (2013.01)

(58) Field of Classification Search
CPC ....... F16K 21/16; F16K 31/047; F16K 31/566
See application file for complete search history.

(56) References Cited

U.S. PATENT DOCUMENTS

| | | | |
|---|---|---|---|
| 3,084,901 A * | 4/1963 | Thorburn | F16K 31/126 251/61.4 |
| 3,620,424 A | 11/1971 | Grigsby | |
| 4,130,135 A | 12/1978 | Moore | |
| 4,511,082 A | 4/1985 | Ballik et al. | |
| 4,840,347 A * | 6/1989 | Ariizumi | F16K 31/1221 251/63.4 |
| 5,350,159 A | 9/1994 | Parker | |
| 5,358,005 A * | 10/1994 | van Prooijen | F16K 31/0655 137/244 |
| 5,505,777 A | 4/1996 | Ciardella | |
| 5,711,989 A | 1/1998 | Ciardella | |
| 6,095,485 A * | 8/2000 | Lebkuchner | F16K 31/54 251/129.02 |
| 7,988,269 B2 | 8/2011 | Murakami et al. | |
| 8,690,009 B2 * | 4/2014 | Crowell | G05D 16/20 222/52 |
| 8,757,511 B2 | 6/2014 | Ciardella | |
| 9,097,248 B2 | 8/2015 | Ono et al. | |
| 9,410,634 B2 | 8/2016 | Gao | |
| 9,457,372 B2 | 10/2016 | Ciardella | |
| 9,592,073 B2 | 3/2017 | Kojima et al. | |
| 9,655,642 B2 | 5/2017 | Gomi et al. | |
| 2006/0102234 A1 | 5/2006 | Meisel | |

(Continued)

*Primary Examiner* — Eric Keasel
(74) *Attorney, Agent, or Firm* — Olav M. Underdal; IDP Patent Services

(57) ABSTRACT

A fluid valve control system includes a linear actuator assembly with a linear actuator, a mechanical amplifier, and a mechanical output member; a fluid control valve, including: a valve body with a fluid chamber and an outlet aperture, a fluid supply line, a plunger member; a fluid reservoir with a pressurized fluid, and a fluid dispensing control unit; such that the fluid flows in a flow from the fluid supply line into the fluid chamber and out via the outlet aperture; such that plunger member moves vertically downward when the outer end of the plunger member is impacted by the mechanical output member, such that an inner end of the plunger member blocks the outlet aperture, such that the flow of the fluid is interrupted.

26 Claims, 13 Drawing Sheets

(56) References Cited

U.S. PATENT DOCUMENTS

2010/0068066 A1    3/2010   Bunker
2016/0334031 A1   11/2016   Shoykhet et al.
2017/0007382 A1    1/2017   Goddard et al.

* cited by examiner

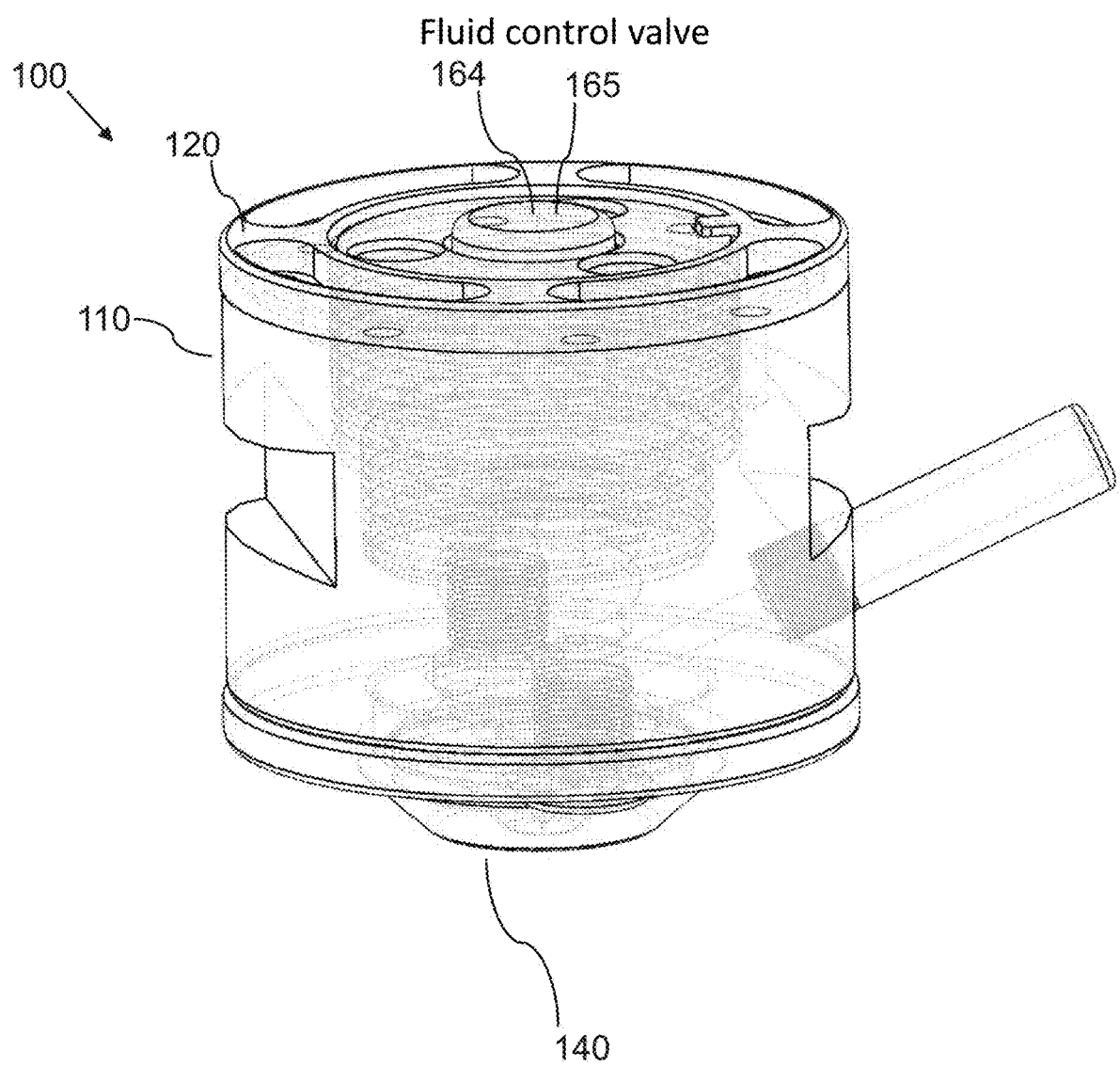

Fluid control valve

Fluid control valve

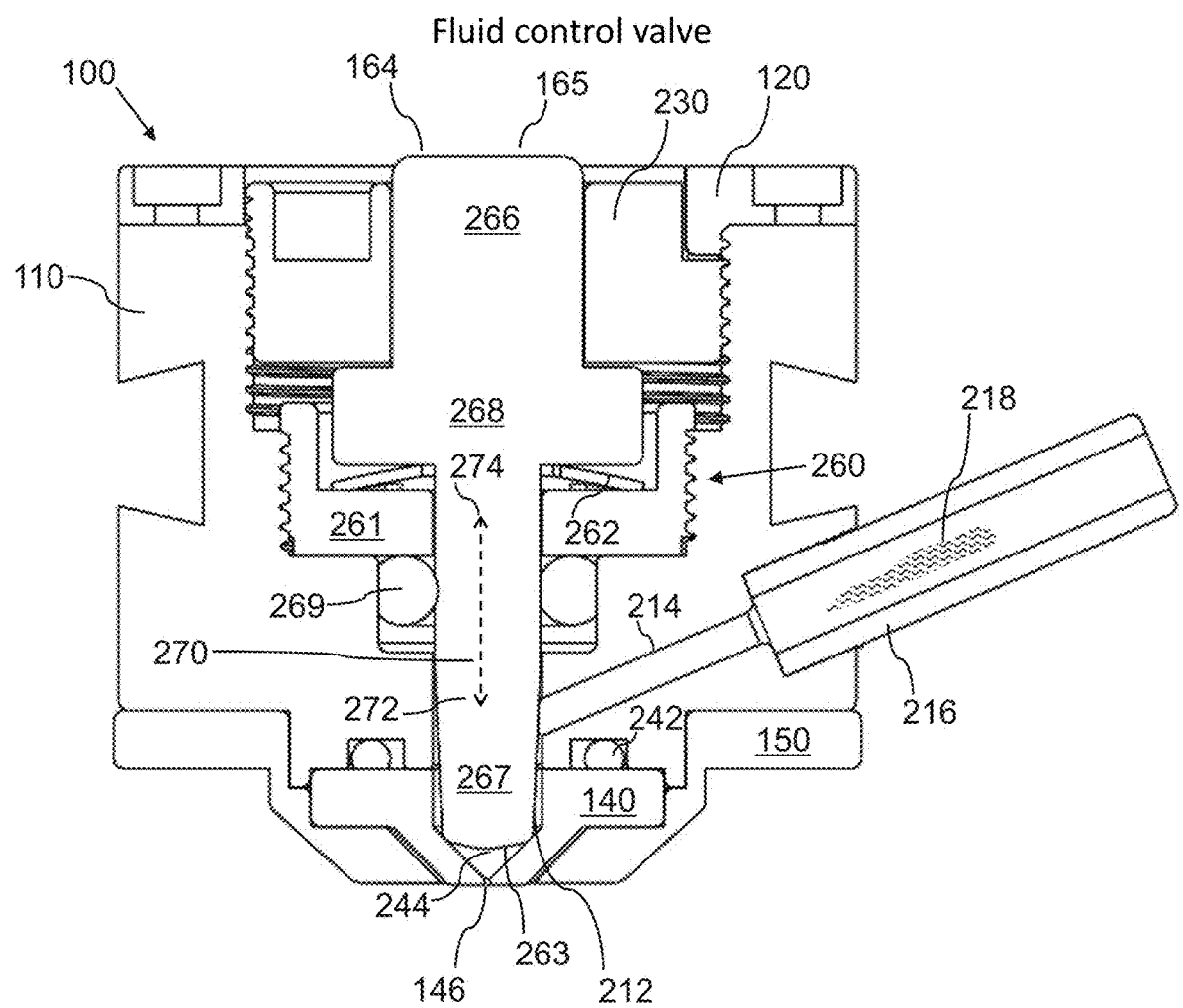

Fluid Dispensing System

FLUID CONTROL VALVE SYSTEM AND DEVICE FOR INTERMITTENTLY STOPPING FLUID FLOW

CROSS-REFERENCE TO RELATED APPLICATIONS

N/A.

FIELD OF THE INVENTION

The present invention relates generally to the field of fluid dispensing control for viscous and inviscid fluids, including fluid dosing onto surfaces or cavities, and more particularly to methods and systems for control of a fluid stream flow by intermittent or periodic stoppage of fluid flow.

BACKGROUND OF THE INVENTION

In live science and electronics, fluid dosing is common practice. The need to dispense controlled doses of fluid onto various devices, and in many instances relatively small doses of wide range of fluids, requires high degree of discretization of fluid dispensed.

The common and traditional way to accomplish this is by way of propelling chunks of fluid or jetting fluids, wherein fluid is fed into a chamber and then a needle moves toward an outlet in a parallel and concentric path to the outlet duct in the same direction as the axis of the fluid outlet forces the fluid material using the solid elements that extrude the fluid.

However, such methods are susceptible to segregation of filled fluid causing separation of various components that make up the dispensed fluid.

As such, considering the foregoing, it may be appreciated that there continues to be a need for novel and improved devices and methods for fluid dispensing control.

SUMMARY OF THE INVENTION

The foregoing needs are met, to a great extent, by the present invention, wherein in aspects of this invention, enhancements are provided to the existing model of fluid dispensing control.

In an aspect, a fluid control valve system can include:
a) a linear actuator assembly with a mechanical output member;
b) a fluid control valve, including:
  i. a valve body with a fluid chamber and an outlet aperture;
  ii. a fluid supply line, which is connected to the valve body, such that the fluid supply line is in fluid contact with the fluid chamber;
  iii. a plunger member, which is mounted to the valve body, such that the plunger member penetrates into and through a part of the fluid chamber, such that an outer end of the plunger member is exposed on an outer surface of the valve body; and
  iv. wherein the mechanical output member of the linear actuator assembly is configured to impact with the outer end of the plunger member of the fluid control valve; and
c) a fluid reservoir, which contains a fluid, which is pressurized, such that the fluid reservoir is in fluid contact with the fluid supply line;
such that the plunger member is configured to be vertically moveable; such that when the plunger member is in a static upper position, without pressure applied to the outer surface of the upper plunger part, an inner end of the plunger member penetrates into the fluid chamber but does not block the outlet aperture, whereby the fluid flows without interruption from the fluid supply line into the fluid chamber and out via the outlet aperture;
wherein the plunger member is configured to move vertically downward when the outer end of the plunger member is impacted by the mechanical output member, such that an inner end of the plunger member blocks the outlet aperture, when the plunger member is in a lowest position after the plunger member is impacted;
whereby the flow of the fluid is interrupted when the outer end of the plunger member is impacted, such that an inner end of the plunger member blocks the outlet aperture.

In a related aspect, the fluid control valve can further include an upper stopping member, which can be mounted to the valve body above the fluid chamber, such that the upper stopping member is configured to stop an upward motion of the plunger member, when the plunger member is in a maximum upward position.

In another related aspect, the upper stopping member can further include a central aperture, such that the upper plunger part can protrude through the central aperture; such that the central plunger part contacts with the upper stopping member, when the plunger member is in the maximum upward position.

In a further related aspect, an upper portion of the valve body can further include a threaded aperture and an outer side of the upper stopping member can further include a threading, such that the upper stopping member can be screwed into the threaded aperture, such that a position of the upper stopping member can be adjustable, whereby the maximum upward position of the plunger member is adjustable.

In a related aspect, the fluid control valve further can further include a plunger spring, which can be mounted to the valve body above the fluid chamber, such that the plunger spring can be configured to cause an upward return motion of the plunger member after the plunger member has reached the lowest position, whereby the plunger spring ensures the outlet aperture is reopened to restart the fluid flow.

In a further related aspect, the plunger spring can further include a spring aperture, such that the lower plunger part protrudes through the spring aperture; such that the central plunger part compresses the plunger spring, when the plunger member moves downward.

In a yet further related aspect, the plunger spring can be configured as a cone-shaped disc spring.

In another yet further related aspect, the fluid control valve can further include a plunger retainer, including a plunger retainer aperture; such that the plunger retainer is mounted inside the valve body below the plunger spring; such that the lower plunger part protrudes through the spring aperture and the plunger retainer aperture;
such that the plunger spring is mounted between the central plunger part and the plunger retainer.

In a further related aspect, a central portion of the valve body can further include a threaded aperture and an outer side of the plunger retainer can include a threading, such that the plunger retainer can be screwed into the threaded aperture, such that a position of the plunger retainer can be adjustable, whereby the maximum downward position of the plunger member is adjustable.

In a related aspect, the fluid control valve can further include a sealing member, which includes a sealing aperture, wherein the sealing member is mounted above the fluid chamber, such that the sealing member is configured to seal the fluid chamber, such that the lower plunger part protrudes through the sealing aperture and into the fluid chamber. The sealing element can be deformable such that the plunger member maintains mechanical contact with the deformable sealing element during vertical movement of the plunger member, such that the deformable sealing element functions as a fluid seal for the fluid reservoir In a further related aspect, the sealing member can be an O-ring, which can be configured to deform when the plunger member moves vertically, such that a tight fluid seal is maintained.

In a related aspect, the linear actuator assembly can further include:
a) a linear actuator, which includes an actuator output member, wherein the linear actuator is configured to execute a first longitudinal movement of the actuator output member, when the linear actuator is activated; and
b) a linear amplitude amplifier, which is a mechanical amplifier, which can include:
a linear input member; and
the mechanical output member;
such that the linear amplitude amplifier amplifies a second longitudinal movement of the linear input member to a third longitudinal movement of the mechanical output member;
such that the actuator output member can impact with the linear input member, such that the first longitudinal movement of the actuator output member causes the second longitudinal movement of the linear input member, which is amplified to the third longitudinal movement of the mechanical output member.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1A is a perspective view of a fluid control valve, according to an embodiment of the invention.

FIG. 2C is a cross-sectional view of a fluid control valve in a closed state, according to an embodiment of the invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1B:
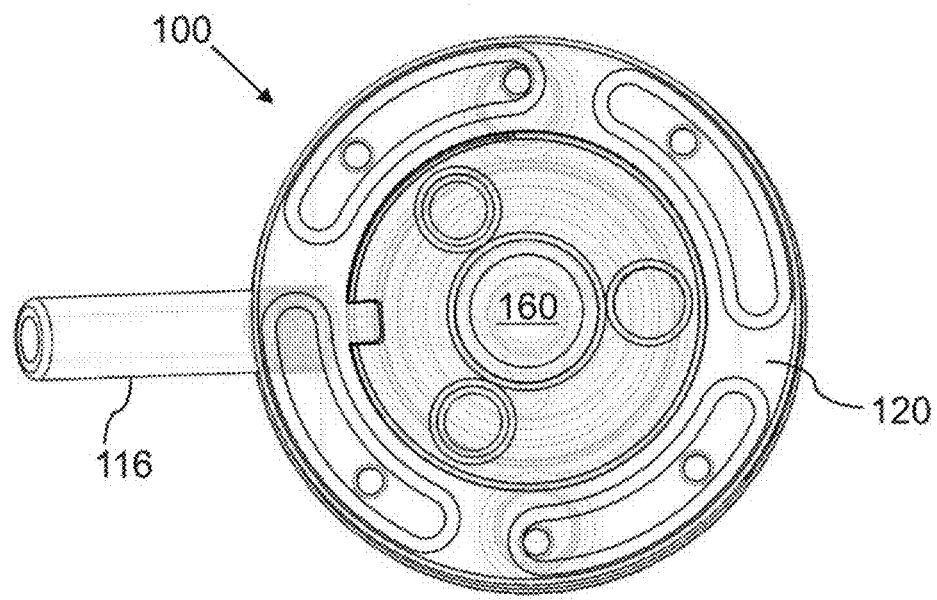
FIG. 1B is a top view of a fluid control valve, according to an embodiment of the invention.
Figure 1C:
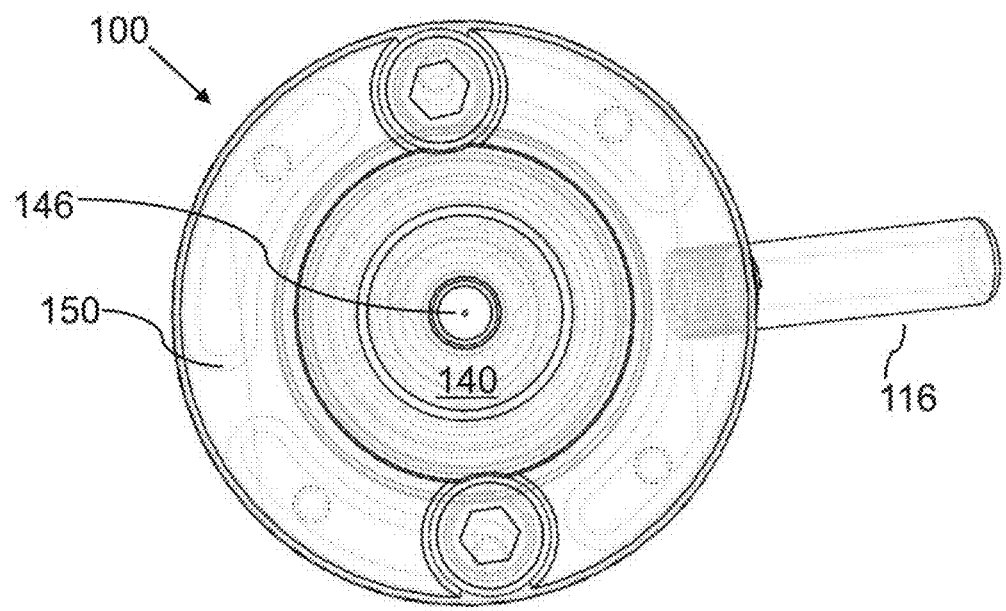
FIG. 1C is a bottom view of a fluid control valve, according to an embodiment of the invention.

In the following, we describe the structure of an embodiment of a fluid control valve 100 with reference to FIG. 1A and a fluid control system 400 with reference to FIG. 4, in such manner that like reference numerals refer to like components throughout; a convention that we shall employ for the remainder of this specification.

In related embodiments, the fluid control valve 100 is designed to control fluid streams by rapidly stopping the flow with a positive shutoff mechanism. the fluid control valve 100 can be used in multiple applications including inviscid and viscous materials dosing, and can partition a fluid flow, thereby yielding finite volumetric doses of material.

Figure 2A:
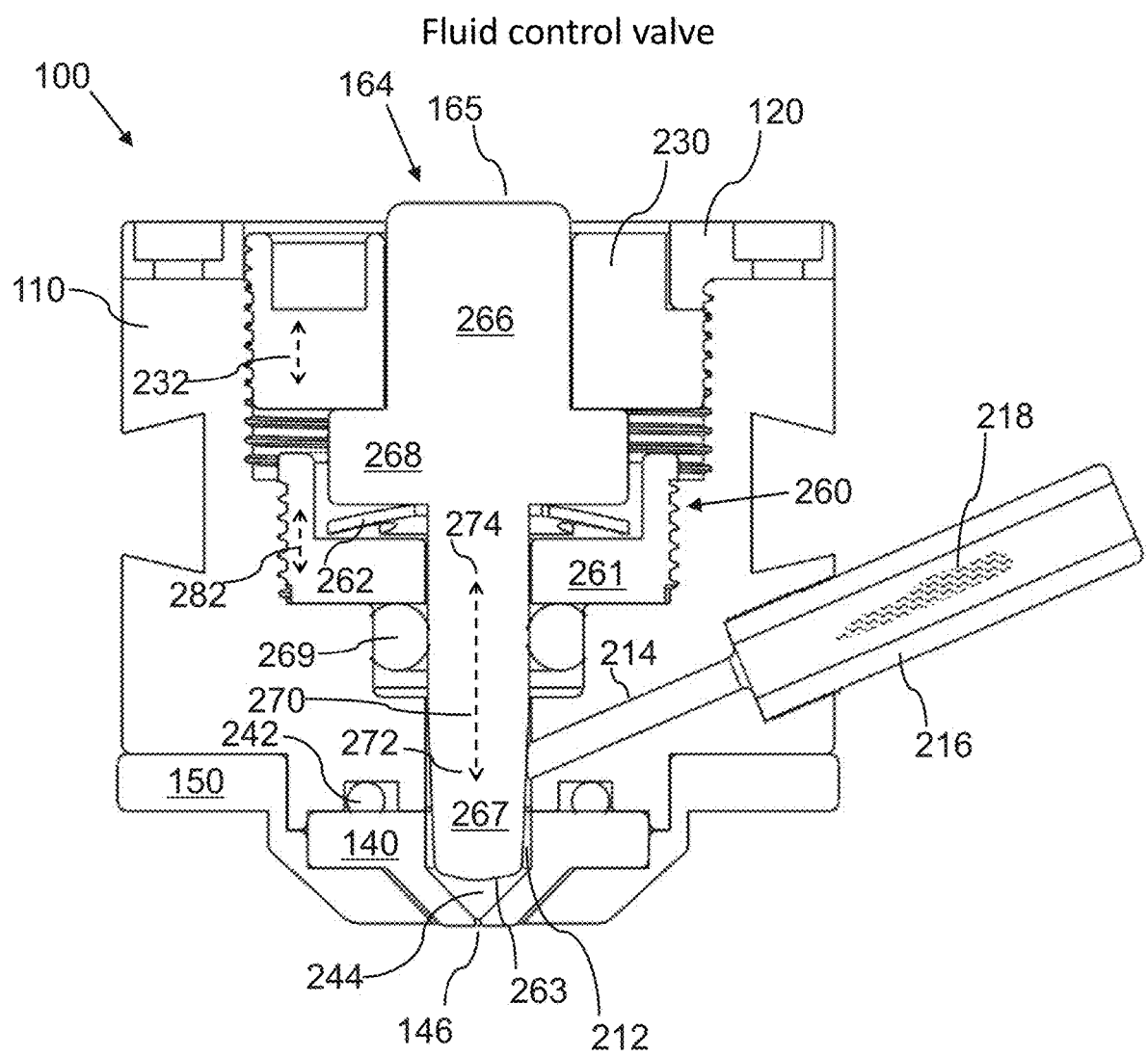
FIG. 2A is a cross-sectional view of a fluid control valve in an open state, according to an embodiment of the invention.
Figure 2B:
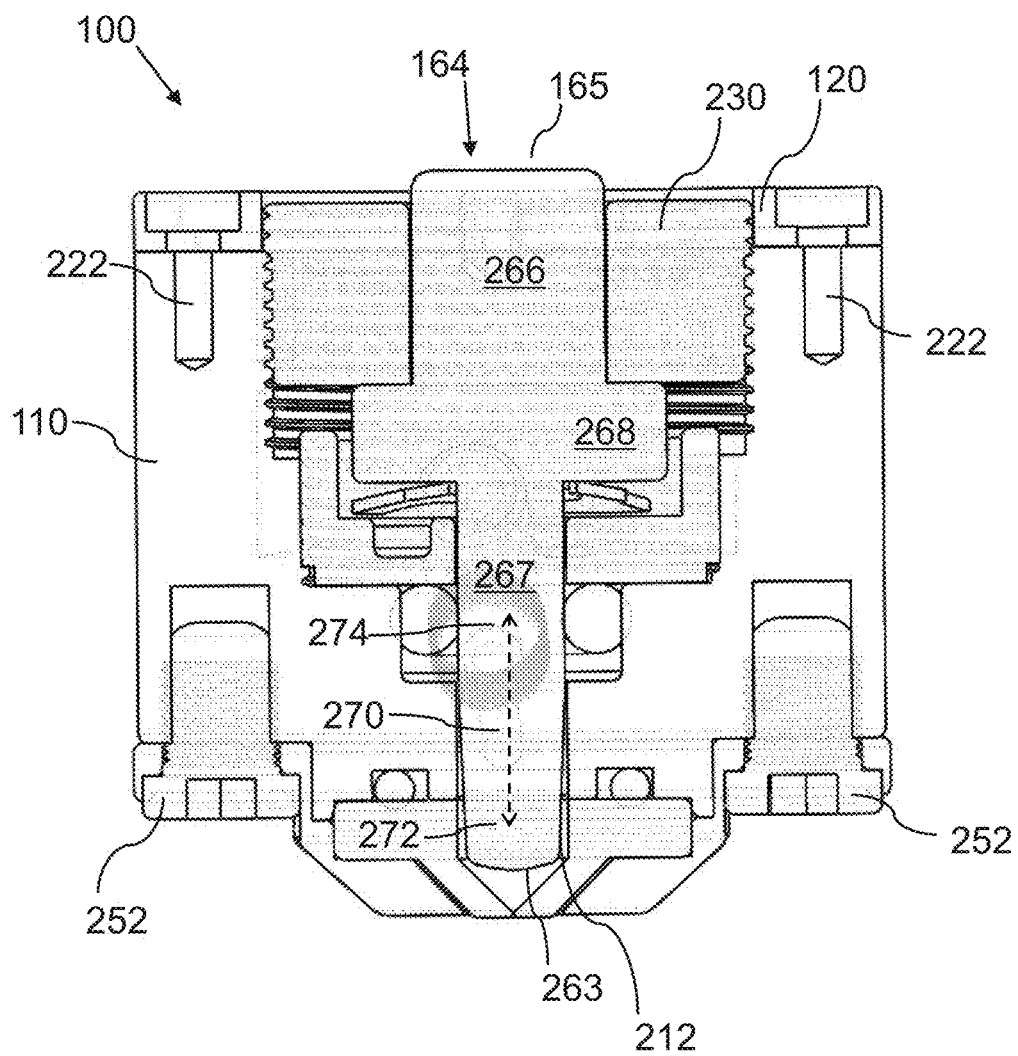
FIG. 2B is a cross-sectional view of a fluid control valve in an open state, according to an embodiment of the invention.
Figure 3A:
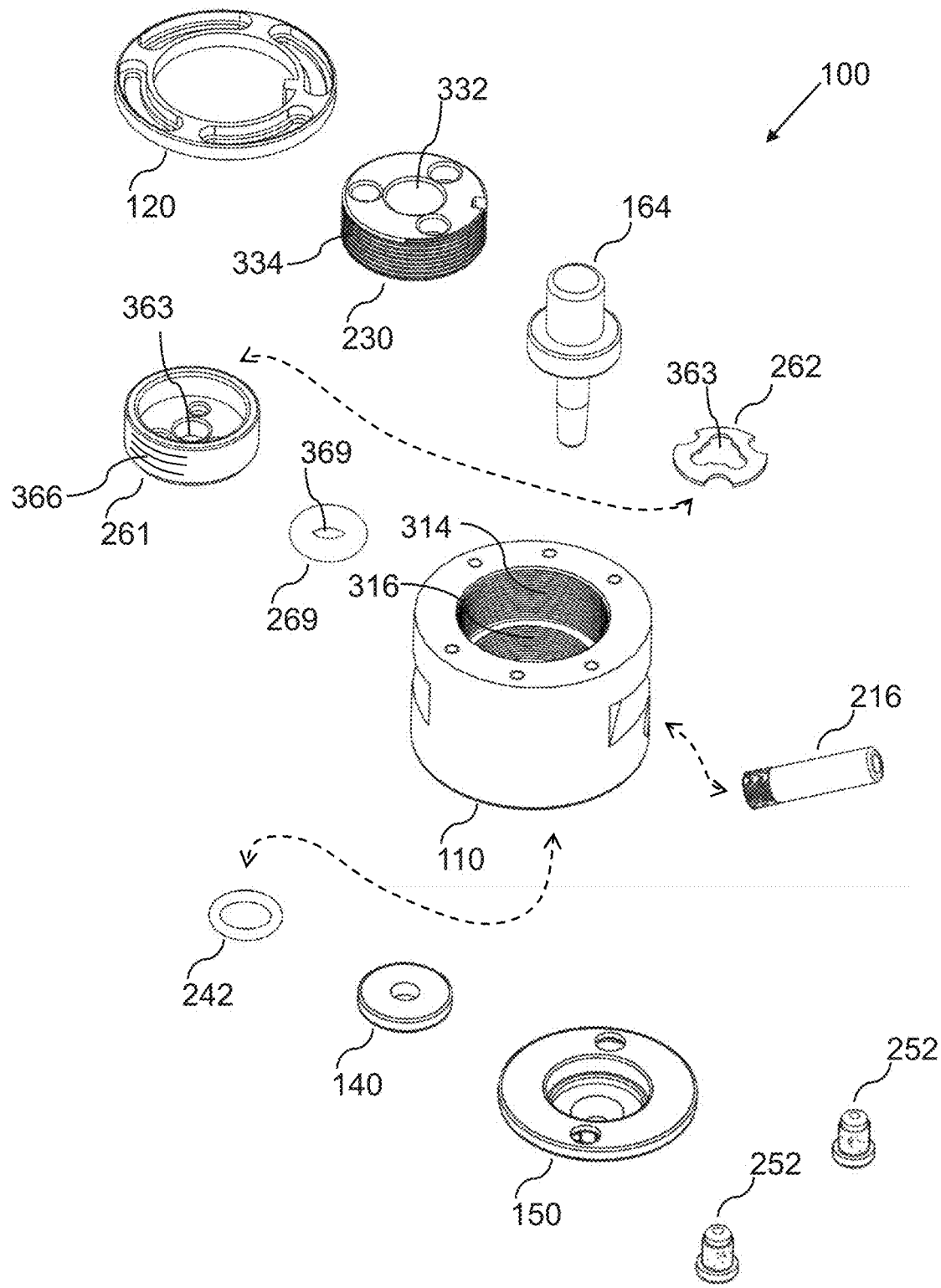
FIG. 3A is a top perspective exploded view of a fluid control valve, according to an embodiment of the invention.
Figure 3B:
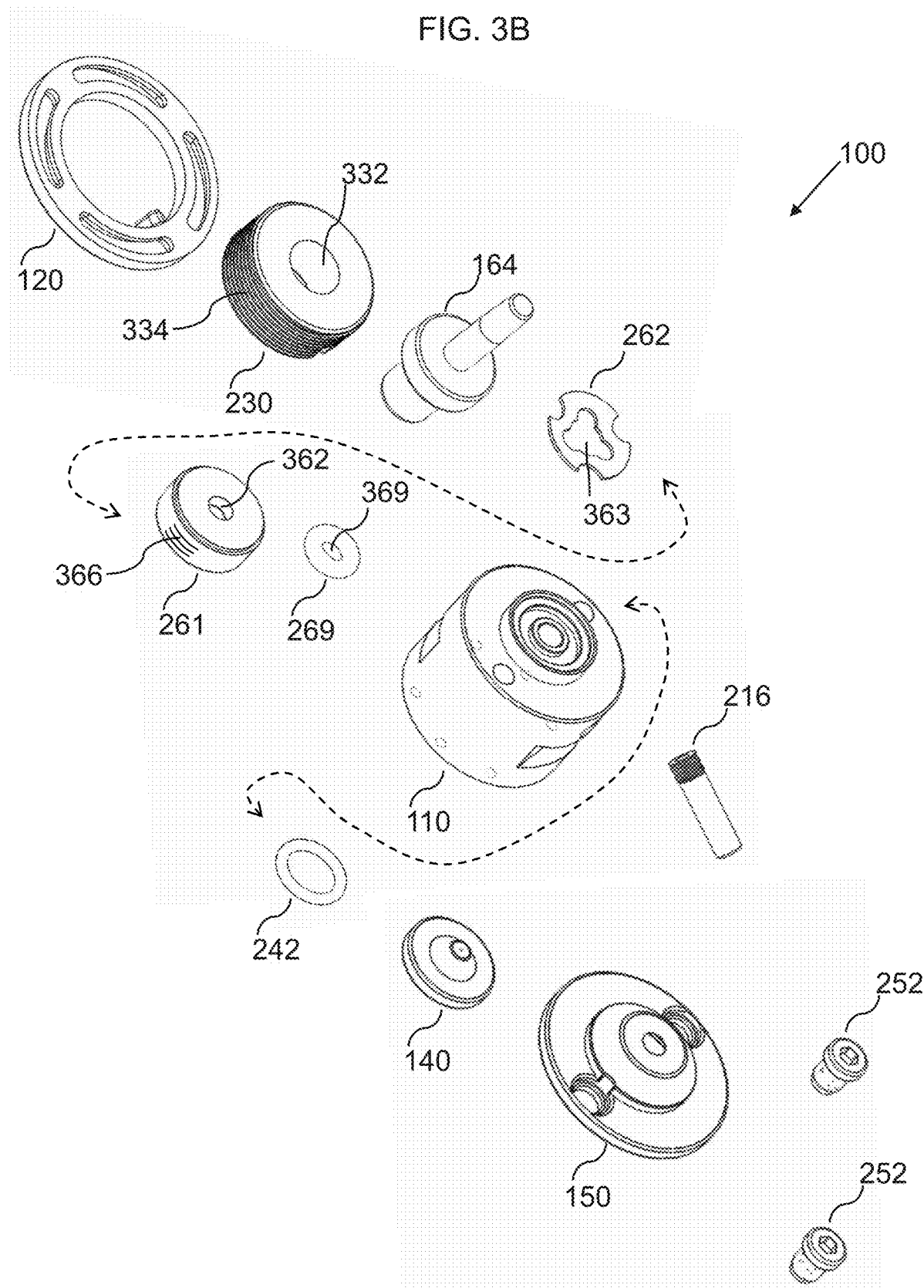
FIG. 3B is a bottom perspective exploded view of a fluid control valve, according to an embodiment of the invention.

In an embodiment, as shown in FIGS. 1A, 1B, 1C, 2A, 2B, 3A, and 3C, a fluid control valve 100 can include:
a) a valve body 110;
b) an upper plate 120, which is mounted on a top of the valve body 110, for example with screws 222 that are fastened into the valve body 110;
c) an upper stopping member 230 with a central aperture 332;
d) a nozzle member 140, including:
   i. a fluid duct 244 that is connected to the fluid chamber 212; and
   ii. an outlet aperture 146, that allows emission of fluid from the fluid duct 244;
   wherein a fluid 218 can stream from the fluid chamber 212 via the fluid duct 244 through the outlet aperture 146. The fluid duct 244 can narrow towards the outlet aperture 146, such that the fluid duct 244 can be conical and/or funnel shaped;
e) a nozzle retaining member 150, which is connected on an outer side of the nozzle member and fastened to a lower end of the valve body 110, for example with screws 252, in order to secure the nozzle member 140;
f) a fluid chamber 212, which is formed inside the valve body 110, such that the fluid chamber 212 is connected to a fluid inlet 214 that is connected to an external fluid supply line 216, which contains a fluid 218, which is pressurized, relative to the ambient pressure level, such that the fluid 218 flows from the external fluid supply line 216 via the fluid inlet 214 into the fluid chamber 212;
g) a nozzle sealing member 242, which can be an O-ring 242, which can be positioned between the valve body 110 and the nozzle member 140; and
h) a plunger assembly 260,
   i. a plunger retainer 261, including a plunger retainer aperture;
   ii. a plunger spring 262;
   iii. a plunger member 164, comprising:
      1) an upper plunger part 266, which protrudes upward
      2) a lower plunger part 267, which protrudes downward; and
      3) a central plunger part 268 that is mounted between the upper and lower plunger parts 266 267, such that the central plunger part 268 protrudes laterally (i.e. has a larger diameter than the upper and lower plunger parts); and
   iv. a plunger sealing member 269, which can be a deformable and resilient O-ring 269, which is mounted below the plunger retainer 261, to seal the fluid chamber 212;
   such that the plunger member 164 protrudes through the sealing member 269, such that the lower plunger part 267 protrudes into the fluid chamber 212, which is formed inside the valve body, between the upper stopping member 230 and the nozzle member 140;
   such that the plunger member 164 is configured to be vertically moveable 270; such that when the blocking member is in a static upper position, without pressure applied to the outer surface of the upper plunger part 266, as shown in FIGS. 2A and 2B, an inner end 263 of the plunger member penetrates into the fluid chamber 212, but does not block the outlet aperture 146, whereby the fluid 218 flows 429 without interruption;
   wherein the plunger member is configured to move vertically downward 272 when the outer end 165 of the plunger member 164 is impacted by the mechanical output member 416, such that an inner end 263 of the plunger member 164 blocks the outlet aperture, as shown in FIG. 2C, when the plunger member 164 is in a lowest position after the plunger member 164 is impacted, such that downward movement 272 of the plunger member 164 can be stopped when the inner end 263 of the plunger member 164 contacts with an inner surface of the nozzle member 140 around the outlet aperture 146, such that the plunger member 164 is stopped in the lowest position;
   whereby the flow of the fluid is interrupted when the outer end 165 of the plunger member 164 is impacted, such that an inner end 263 of the plunger member 164 blocks the outlet aperture 146.

In a related embodiment, as shown in FIG. 2C, the inner end 263 of the plunger member 164 can be configured to match with an inner surface of the fluid duct 244, such that the inner end 263 of the plunger member 164 seals and blocks the outlet aperture 146, such that fluid connection from the fluid chamber 212 to the outlet aperture 146 is blocked.

In related embodiments, vertical motion 270, downward motion 272, and upward motion 274 of the plunger member 164 shall be understood relative to the disclosed drawings; but the valve and/or the plunger member 164 may be oriented such that respective movements are:
a) elongated motion 270, rightward (or leftward) motion 272, and leftward (or rightward) motion 274;
b) elongated motion 270, inward motion 272, and opposite outward motion 274; or
c) elongated motion 270, first direction motion 272, and opposite second direction motion 274;
and such orientations shall properly be understood to be fully included, whenever a relative reference to downward or upward motion 272 274 is described herein, in the specification and the claims. Any disclosure herein to a downward motion 272 of the plunger member 164 shall therefore be understood to include alternative/related embodiments with an inward/first motion 272, and any reference to an upward motion 274 of the plunger member 164 shall therefore be understood to include alternative/related embodiments with an outward/second motion 274.

Figure 4:
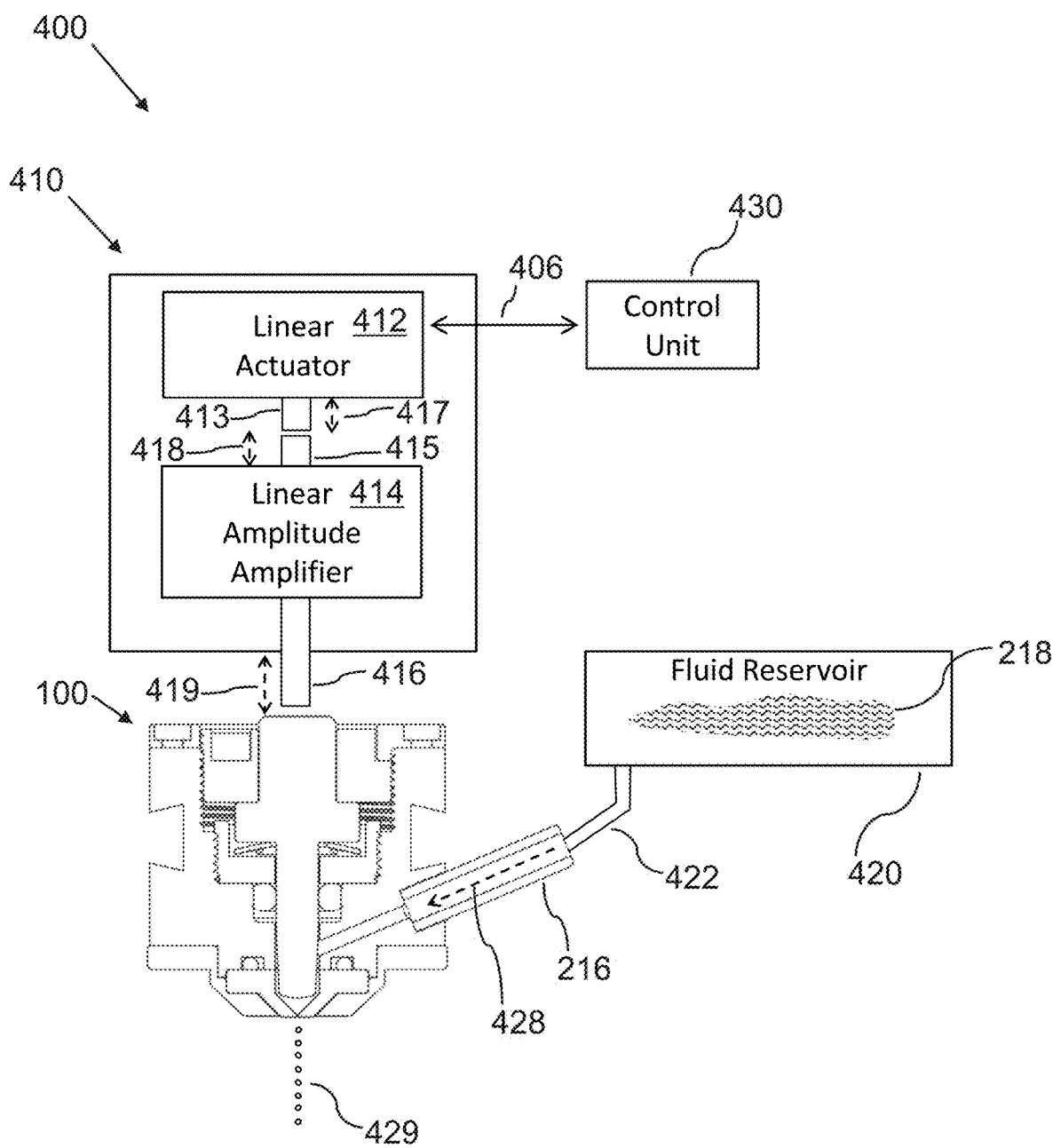
FIG. 4 is a schematic diagram illustrating a fluid dispensing system, according to an embodiment of the invention.

In a related embodiment, as shown in FIG. 4, a fluid control valve system 400, also called a fluid dispensing system 400, can include:
a) a linear actuator assembly 410, which includes a mechanical output member 416;
b) a fluid control valve 100, including:
   i. a valve body 110, which includes
      1. a fluid chamber 212 in an interior of the valve body; and
      2. an outlet aperture 146, which is in fluid contact with the fluid chamber 212;
   ii. a fluid supply line 216 (also called a fluid inlet 216), which is connected to the valve body 110, such that the fluid supply line 216 is in fluid contact with the fluid chamber 212;
   iii. a plunger member 164, which is mounted to the valve body 110, such that the plunger member 164 penetrates into the valve body 110 and through a part of the fluid chamber 212, such that an outer end 165 of the plunger member 164 is exposed on an outer surface of the valve body 110; and
   wherein the mechanical output member 416 of the linear actuator assembly 410 is configured to impact with the outer end 165 of the plunger member 164 of the fluid control valve 100; and c) a fluid reservoir 420, which contains a fluid 218, which is pressurized, such that the fluid reservoir 420 is in fluid contact with the fluid supply line 216, for example via a fluid line 422;

such that the fluid 218 flows in a flow 428 from the fluid supply line 216 into the fluid chamber 212 and out via the outlet aperture 146, when the outlet aperture 146 is open, i.e. when the outlet aperture 146 is not blocked by an inner end 263 of the plunger member 164, such as when the plunger member 164 is in a maximum upward position, as shown in FIGS. 2A and 2B;

wherein the plunger member 164 is configured to move vertically downward 272 when the outer end 165 of the plunger member 164 is impacted by the mechanical output member 416, such that an inner end 263 of the plunger member 164 blocks the outlet aperture 146, when the plunger member 164 is in a lowest position after the plunger member 164 is impacted, as shown in FIG. 2C;

whereby the flow 428 of the fluid 218 is interrupted when the outer end 165 of the plunger member 164 is impacted, such that an inner end 263 of the plunger member blocks the outlet aperture 146.

In an embodiment, as shown in FIGS. 1A, 1B, 1C, 2A, 2B, 3A, and 3C, a fluid control valve 100 can include:

a) a valve body 110, which can include:
a fluid chamber 212 in an interior of the valve body; and
an outlet aperture 146, which is in fluid contact with the fluid chamber;

b) a fluid supply line 216, which is connected to the valve body 110, such that the fluid supply line 216 is in fluid contact with the fluid chamber 212; such that the fluid supply line 216 is configured to be connectable to a fluid reservoir 420, which contains a fluid 218, which is pressurized, such that the fluid reservoir 420 is in fluid contact with the fluid supply line 216; and c) a plunger member 164, which is mounted to the valve body 110, such that the plunger member 164 penetrates into the valve body 110, such that an outer end 165 of the plunger member 164 is exposed on an outer surface of the valve body 110;

such that the fluid control valve 100 is configured to allow the fluid 218 to flow in a flow 428 from the fluid supply line 216 into the fluid chamber 212 and out via the outlet aperture 146;

wherein the plunger member 164 is configured to move toward the outlet aperture 146 when the outer end 165 of the plunger member 164 is impacted, such that an inner end 263 of the plunger member 164 blocks the outlet aperture 146, when the plunger member 164 is in a lowest position after the plunger member 164 is impacted;

whereby the flow 428 of the fluid 218 is interrupted when the outer end 165 of the plunger member 164 is impacted.

Figure 8A:
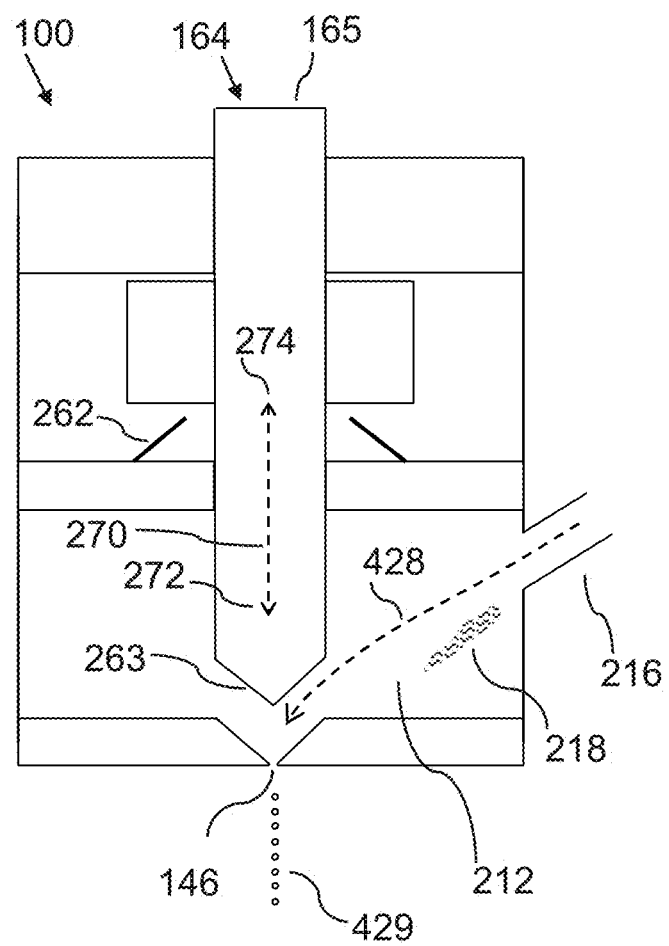
FIG. 8A is a schematic cross-sectional view of a fluid control valve, according to an embodiment of the invention.

FIG. 8A shows a schematic and simplified view of the fluid control valve 100 in an open state, such that the fluid 218 flows in a flow 428 from the fluid supply line 216 into the fluid chamber 212 and out via the outlet aperture 146.

Figure 8B:
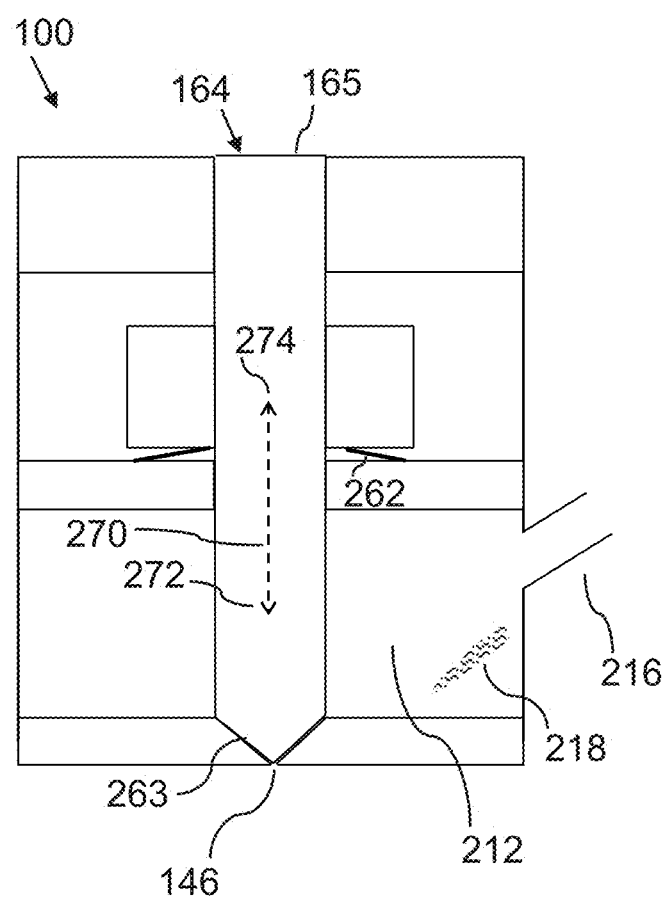
FIG. 8B is a schematic cross-sectional view of a fluid control valve, according to an embodiment of the invention.

FIG. 8B shows a schematic and simplified view of the fluid control valve 100 in a closed state, when the plunger member 164 is in a lowest position after the plunger member 164 is impacted, such that the inner end 263 of the plunger member 164 blocks the outlet aperture 146.

In a related embodiment, as shown in FIGS. 2A and 2B, the fluid control valve 100 can further include an upper stopping member 230, which can be mounted to the valve body 110 above the fluid chamber 212, such that the upper stopping member 230 is configured to stop an upward motion 274 of the plunger member 164, when the plunger member 164 is in a maximum upward position.

In another related embodiment, as shown in FIGS. 1A, 2B, 3A and 3B, the upper stopping member 230 can further include a central aperture 332, which penetrates the upper stopping member 230, such that the upper plunger part 266 can protrude through the central aperture 332;

such that the central plunger part 268 contacts/impacts with the upper stopping member 230, when the plunger member 164 is in the maximum upward position.

In a further related embodiment, as shown in FIGS. 1A, 2B, 3A and 3B, an upper portion of the valve body 110 can further include a threaded aperture 314 and an outer side of the upper stopping member can further include a threading 334, such that the upper stopping member 230 can be screwed into the threaded aperture 314, such that a vertical position 232 of the upper stopping member can be adjustable, depending on how far the upper stopping member 230 is screwed into the threaded aperture 314, whereby the maximum upward position of the plunger member 164 is adjustable.

In a related embodiment, the fluid control valve 100 further can further include a plunger spring 262, which can be mounted to the valve body 110 above the fluid chamber 212, such that the plunger spring 262 can be configured to dampen a downward motion 270 of the plunger member 164 and cause an upward return motion 274 of the plunger member after the plunger member 164 has reached the lowest position, whereby the plunger spring 262 ensures the outlet aperture 146 is unblocked/reopened to restart the fluid flow. The plunger spring further functions as a dampener, such that after impact, the two colliding elements, i.e. the mechanical output member 416 and the plunger member 164, do not separate and travel together and keep contact, until stoppage when the plunger member 164 reaches a lowest position.

In a further related embodiment, the plunger spring 262 can further include a spring aperture 363, which protrudes through the plunger spring 262, such that the lower plunger part 267 protrudes through the spring aperture 363;

such that the central plunger part 268 compresses the plunger spring, when the plunger member moves downward 274 towards a fully compressed position, as shown in FIG. 2C.

In a yet further related embodiment, the plunger spring 262 can be configured as a cone-shaped disc spring 262, which can help maintain concentricity of the plunger member 164 and the plunger spring 262. Such a cone-shaped disc 262 spring can also be referred to as a Belleville washer 262, Belleville spring 262, conical spring washer 262, or conical disc spring 262.

In another yet further related embodiment, as shown in FIGS. 1A, 2B, and 3C, the fluid control valve 100 can further include a plunger retainer 261, including a plunger retainer aperture 362; such that the plunger retainer 261 is mounted inside the valve body 110 below the plunger spring 262;

such that the lower plunger part 267 protrudes through the spring aperture 363 and the plunger retainer aperture 362; such that the plunger spring 262 is mounted between the central plunger part 268 and the plunger retainer 261.

In a further related embodiment, a central portion of the valve body 110 can further include a threaded aperture 316 and an outer side of the plunger retainer can include a threading 366, such that the plunger retainer 261 can be screwed into the threaded aperture 316, such that a vertical position 282 of the plunger retainer 261 can be adjustable, whereby the maximum downward position of the plunger member 164 is adjustable.

In a related embodiment, the fluid control valve 100 can further include a plunger sealing member 269, which includes a sealing aperture 369, wherein the plunger sealing member 269 is mounted above the fluid chamber 212, such that the plunger sealing member 269 is configured to seal the fluid chamber 212, such that the lower plunger part 267 protrudes through the sealing aperture 369 and into the fluid chamber 212. The plunger sealing member 269 can be deformable and resilient, such that the plunger sealing member 269 maintains mechanical contact with the deformable plunger sealing member 269 during vertical movement 270 of the plunger member 164, such that the deformable plunger sealing member 269 functions as a fluid seal for the fluid reservoir.

Figure 7:
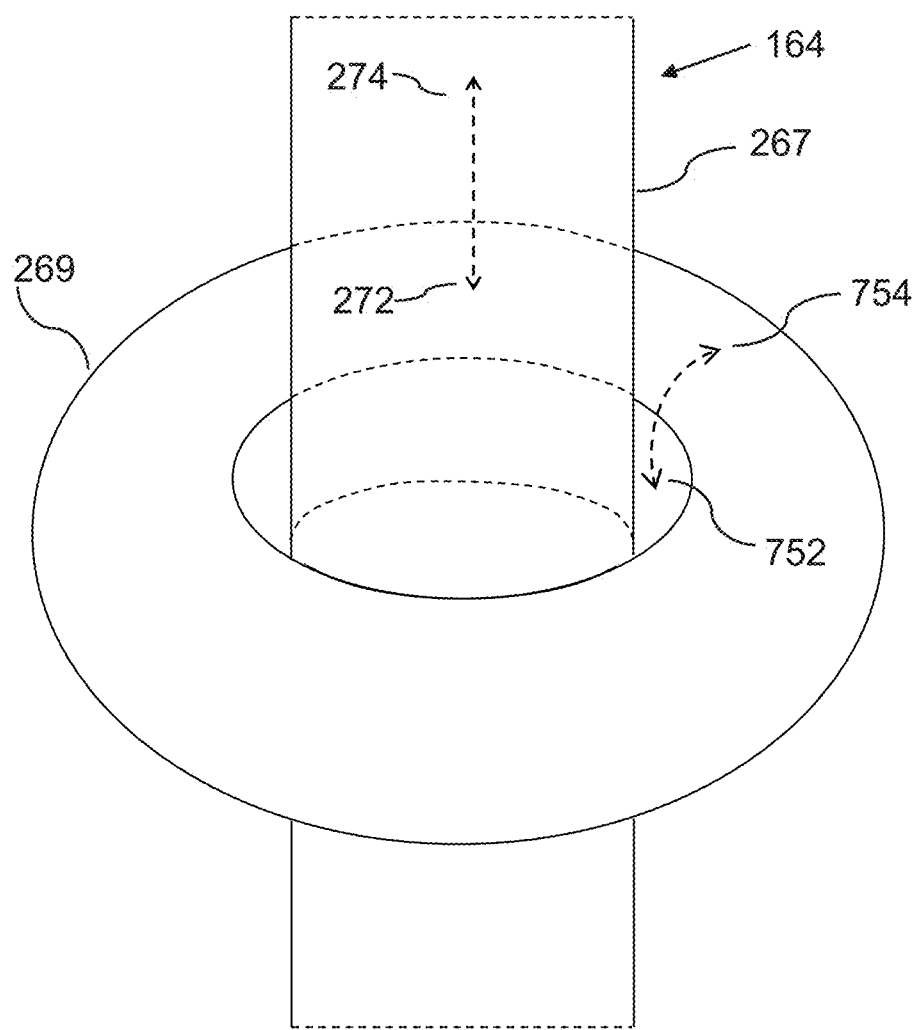
FIG. 7 is a schematic perspective view of a plunger sealing member with a lower plunger part protruding through, according to an embodiment of the invention.

In a further related embodiment, as shown in FIG. 7, the plunger sealing member 269 can be an O-ring 269, which can be configured to deform in a twisting motion 752 754 when the plunger member 164 moves vertically 270, such that static contact is maintained between the plunger member 164 and the O-ring 269 by an inward twisting motion 752 of the O-ring 269 when the plunger member 164 moves downward 272, and by an outward twisting motion 754 of the O-ring 269 when the plunger member 164 moves upward 274, thereby avoiding friction sliding between the lower plunger part 267 and the O-ring 269, such that a tight fluid seal is maintained, and friction and wear from relative motion between the plunger member 164 and the plunger sealing member 269 is avoided or reduced.

Figure 5:
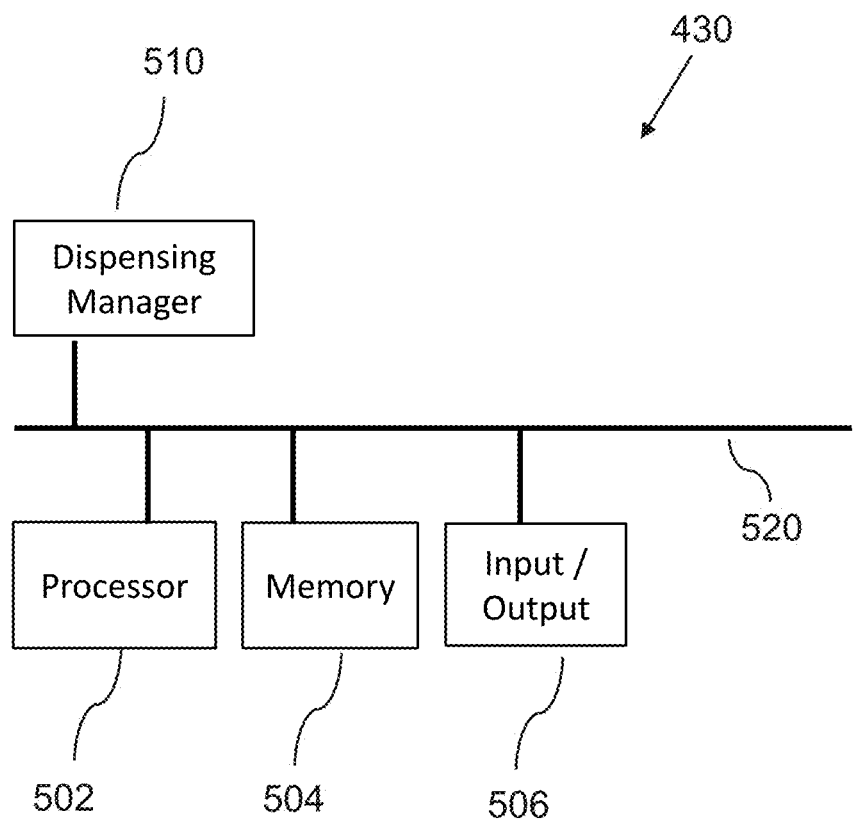
FIG. 5 is a schematic diagram illustrating a fluid dispensing control unit, according to an embodiment of the invention.

In a related embodiment, as shown in FIGS. 4 and 5, the linear actuator assembly 410 can further include:
- a) a linear actuator 412, which includes an actuator output member 413, wherein the linear actuator 412 is configured to execute a first longitudinal movement 417 of the actuator output member 413, when the linear actuator 412 is activated; and
- b) a linear amplitude amplifier 414, which is a mechanical amplifier 414, which can include:
  a linear input member 415; and
  the mechanical output member 416;
  such that the linear amplitude amplifier 414 is configured to amplify a second longitudinal movement 418 of the linear input member 415 to a third longitudinal movement 419 of the mechanical output member 416;

such that the actuator output member 413 is configured to impact with the linear input member 415, such that the first longitudinal movement 417 of the actuator output member 413 causes the second longitudinal movement 418 of the linear input member 415, which is amplified to the third longitudinal movement 419 of the mechanical output member 416.

In related embodiments, the linear actuator 412 can be a piezoelectric actuator 412 or an electro-mechanical actuator 412. In some cases, it can be a pneumatic actuator 412, twisted and coiled polymer (TCP) actuator 412, a mechanical actuator 412, or other type of linear actuator. For a linear actuator 412 with a relatively small movement of the actuator output member 413, such as a piezoelectric actuator 412, the linear amplitude amplifier 414 is necessary to amplify the movement sufficiently. In some embodiments, a linear amplitude amplifier 414 may not be necessary.

Figure 6:
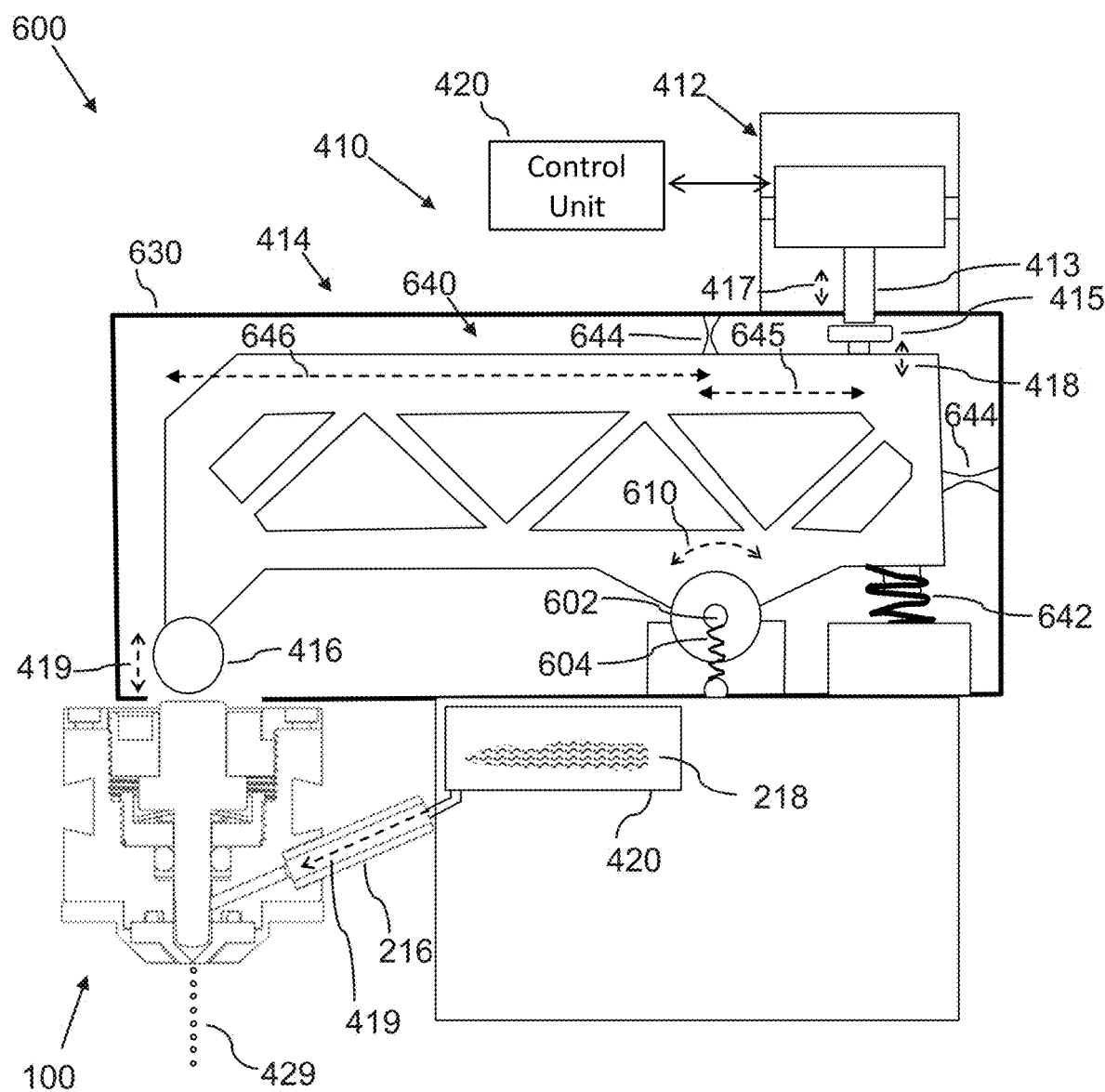
FIG. 6 is a cross-sectional view of a fluid control valve mounted with a linear actuator and a mechanical amplifier, according to an embodiment of the invention.

In a further related embodiment, as shown in FIG. 6, the linear amplitude amplifier 414 can include an elongated lever 640, which is rotatably mounted in a pivot point 602, wherein the linear input member 415 is connected to an inner end of the elongated lever 640 and the mechanical output member 416 is connected to an outer end of the elongated lever 640;
such that an outer length 645 of the elongated lever 640 from the pivot point 602 to the outer end (which is vertically aligned with the mechanical output member 416) is longer than an inner length 646 of the elongated lever 640 from the pivot point 602 to the inner end (which is vertically aligned with the linear input member 415);
such that the linear amplitude amplifier 414 is configured to amplify a second longitudinal movement 418 of the linear input member 415 to a third longitudinal movement 419 of the mechanical output member 416, such that the third longitudinal movement 419 is larger than the second longitudinal movement 418.

In a related embodiment, the elongated lever 640, can be rotatably mounted to the pivot point 602 with a pivot spring 604, to dampen a rotation 610 of the elongated lever 640 and ensure the elongated lever 640 returns to a level position. Further, at least one dampening spring 642 and/or rubber dampeners 644 can be mounted between the elongated lever 640 and an enclosure 630 to dampen a rotation 610 of the elongated lever 640 and ensure the elongated lever 640 returns to a level position.

In a related embodiment, the fluid dispensing system 400 can further include a fluid dispensing control unit 430, which is configured to control activation of the mechanical output member 416, wherein the fluid dispensing control unit 430 can include:
- a) A processor 502;
- b) A non-transitory memory 504;
- c) An input/output 506; and
- d) A dispensing manager 510, which is configured to control activation of the linear actuator 412; all connected via
- e) A data bus 520.

In a related embodiment, the fluid dispensing control unit 430 can be configured to control activation of the mechanical output member 416 to oscillate vertically with a predetermined oscillation frequency and a predetermined input oscillation amplitude such that the output member 416 oscillates vertically with the predetermined oscillation frequency and a corresponding output oscillation amplitude; whereby the flow 428 of the fluid 218 is interrupted repeatedly when the outer end 165 of the plunger member 164 is impacted, such that an inner end 263 of the plunger member blocks the outlet aperture 146;
whereby the outlet aperture 146 emits an interrupted flow 429 of the fluid 218, typically in the form of a stream of droplets 429.

FIGS. 4, 5, and 6 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 4, 5, and 6 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 4 shows a depiction of an embodiment of the fluid control valve system 400, including the fluid dispensing control unit 430.

It shall be understood that the above-mentioned components of fluid dispensing control unit 430 are to be interpreted in the most general manner.

For example, the processor 502 can include a single physical microprocessor or microcontroller, a cluster of processors, a datacenter or a cluster of datacenters, a computing cloud service, and the like.

In a further example, the non-transitory memory 504 can include various forms of non-transitory storage media, including random access memory and other forms of dynamic storage, and hard disks, hard disk clusters, cloud storage services, and other forms of long-term storage. Similarly, the input/output 506 can include a plurality of well-known input/output devices, such as screens, keyboards, pointing devices, motion trackers, communication ports, and so forth.

Furthermore, it shall be understood that the fluid dispensing control unit 430 can include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the fluid dispensing control unit 430 communicates with the linear actuator assembly 410 (for example directly to the linear actuator 412) over a network 406, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the fluid control valve 100 and the fluid control system 400, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A fluid control valve system, comprising:
a) a linear actuator assembly, which comprises:
a linear actuator, which comprises an actuator output member, wherein the linear actuator is configured to execute a first longitudinal movement of the actuator output member, when the linear actuator is activated; and
a linear amplitude amplifier, which is a mechanical amplifier, which comprises:
a linear input member; and
a mechanical output member;
such that the linear amplitude amplifier is configured to amplify a second longitudinal movement of the linear input member to a third longitudinal movement of the mechanical output member;
such that the actuator output member is configured to impact with the linear input member, such that the first longitudinal movement causes the second longitudinal movement, which is amplified to the third longitudinal movement;
b) a fluid control valve, including:
a valve body, which comprises:
a fluid chamber in an interior of the valve body; and
an outlet aperture, which is in fluid contact with the fluid chamber;
a fluid supply line, which is connected to the valve body, such that the fluid supply line is in fluid contact with the fluid chamber; and
a plunger member, which is mounted to the valve body, such that the plunger member penetrates into the valve body, such that an outer end of the plunger member is exposed on an outer surface of the valve body;
wherein the mechanical output member of the linear actuator assembly is configured to impact with the outer end of the plunger member; and
c) a fluid reservoir, which contains a fluid, which is pressurized, such that the fluid reservoir is in fluid contact with the fluid supply line;
such that the fluid flows in a flow from the fluid supply line into the fluid chamber and out via the outlet aperture;
wherein the plunger member is configured to move vertically downward when the outer end of the plunger member is impacted by the mechanical output member, such that an inner end of the plunger member blocks the outlet aperture, when the plunger member is in a lowest position after the plunger member is impacted;
whereby the flow of the fluid is interrupted when the outer end of the plunger member is impacted.

2. The fluid control valve system of claim 1, wherein the fluid control valve further comprises an upper stopping member, which is mounted to the valve body above the fluid chamber, such that the upper stopping member is configured to stop an upward motion of the plunger member, when the plunger member is in a maximum upward position.

3. The fluid control valve system of claim 2, wherein the plunger member further comprises:
a) an upper plunger part, which protrudes upward;
b) a lower plunger part, which protrudes downward; and
c) a central plunger part, which is mounted between the upper plunger part and the lower plunger part, such that the central plunger part protrudes laterally;
wherein the upper stopping member further comprises a central aperture, such that the upper plunger part protrudes through the central aperture;
such that the central plunger part contacts with the upper stopping member, when the plunger member is in the maximum upward position.

4. The fluid control valve system of claim 2, wherein an upper portion of the valve body comprises a threaded aperture and an outer side of the upper stopping member comprises a threading, such that the upper stopping member is screwed into the threaded aperture, such that a position of the upper stopping member is adjustable, whereby the maximum upward position of the plunger member is adjustable.

5. The fluid control valve system of claim 1, wherein the fluid control valve further comprises a plunger spring, which is mounted to the valve body above the fluid chamber, such that the plunger spring is configured to cause an upward return motion of the plunger member after the plunger member has reached the lowest position.

6. The fluid control valve system of claim 5, wherein the plunger member further comprises:
a) an upper plunger part, which protrudes upward;
b) a lower plunger part, which protrudes downward; and
c) a central plunger part, which is mounted between the upper plunger part and the lower plunger part, such that the central plunger part protrudes laterally;
wherein the plunger spring further comprises a spring aperture, such that the lower plunger part protrudes through the spring aperture;
such that the central plunger part compresses the plunger spring, when the plunger member moves downward.

7. The fluid control valve system of claim 6, wherein the plunger spring is configured as a cone-shaped disc spring.

8. The fluid control valve system of claim 6, wherein the fluid control valve further comprises a plunger retainer, comprising a plunger retainer aperture; such that the plunger retainer is mounted inside the valve body below the plunger spring;
such that the lower plunger part protrudes through the plunger retainer aperture;
such that the plunger spring is mounted between the central plunger part and the plunger retainer.

9. The fluid control valve system of claim 8, wherein a central portion of the valve body comprises a threaded aperture and an outer side of the plunger retainer comprises a threading, such that the plunger retainer is screwed into the threaded aperture, such that a position of the plunger retainer is adjustable, whereby the maximum downward position of the plunger member is adjustable.

10. The fluid control valve system of claim 1, wherein the plunger member further comprises:
a) an upper plunger part, which protrudes upward;
b) a lower plunger part, which protrudes downward; and
c) a central plunger part, which is mounted between the upper plunger part and the lower plunger part, such that the central plunger part protrudes laterally;
wherein the fluid control valve further comprises a sealing member, which comprises a sealing aperture, wherein the sealing member is mounted above the fluid chamber, such that the sealing member is configured to seal the fluid chamber, such that the lower plunger part protrudes through the sealing aperture and into the fluid chamber.

11. The fluid control valve system of claim 10, wherein the sealing member is an O-ring, which is configured to deform in a twisting motion when the plunger member moves vertically, such that a tight sealing is maintained.

12. The fluid control valve system of claim 1, wherein the linear amplitude amplifier further comprises an elongated lever, which is rotatably mounted in a pivot point, wherein the linear input member is connected to an inner end of the elongated lever and the mechanical output member is connected to an outer end of the elongated lever;

such that an outer length of the elongated lever from the pivot point to the outer end is longer than an inner length of the elongated lever from the pivot point to the inner end.

13. The fluid control valve system of claim 1, further comprising:

a fluid dispensing control unit;

wherein the fluid dispensing control unit is configured to control activation of the actuator output member to oscillate vertically with a predetermined oscillation frequency and a predetermined input oscillation amplitude, such that the mechanical output member oscillates vertically with the predetermined oscillation frequency and a corresponding output oscillation amplitude;

whereby the flow of the fluid is interrupted repeatedly when the outer end of the plunger member is impacted;

whereby the outlet aperture emits an interrupted flow of the fluid.

14. The fluid control valve system of claim 1, further comprising a fluid dispensing control unit, comprising:
a) a processor;
b) a non-transitory memory;
c) an input/output; and
d) a dispensing manager, which is configured to control activation of the linear actuator; all connected via
e) a data bus.

15. A fluid control valve, comprising:
a) a valve body, which comprises:
a fluid chamber in an interior of the valve body; and
an outlet aperture, which is in fluid contact with the fluid chamber;
b) a fluid supply line, which is connected to the valve body, such that the fluid supply line is in fluid contact with the fluid chamber;
such that the fluid supply line is configured to be connectable to a fluid reservoir, which contains a fluid, which is pressurized, such that the fluid reservoir is in fluid contact with the fluid supply line; and
c) a plunger member, which is mounted to the valve body, such that the plunger member penetrates into the valve body, such that an outer end of the plunger member is exposed on an outer surface of the valve body, wherein the plunger member further comprises:
an upper plunger part, which protrudes upward;
a lower plunger part, which protrudes downward; and
a central plunger part, which is mounted between the upper plunger part and the lower plunger part, such that the central plunger part protrudes laterally;
such that the fluid control valve is configured to allow the fluid to flow in a flow from the fluid supply line into the fluid chamber and out via the outlet aperture;
wherein the plunger member is configured to move toward the outlet aperture when the outer end of the plunger member is impacted, such that an inner end of the plunger member blocks the outlet aperture, when the plunger member is in a lowest position after the plunger member is impacted;
wherein the fluid control valve further comprises a sealing member, which comprises a sealing aperture, wherein the sealing member is mounted above the fluid chamber, such that the sealing member is configured to seal the fluid chamber, such that the lower plunger part protrudes through the sealing aperture and into the fluid chamber;
wherein the sealing member is an O-ring, which is configured to deform in a twisting motion when the plunger member moves vertically, such that a static contact is maintained between the plunger member and the O-ring, such that a tight sealing is maintained;
whereby the flow of the fluid is interrupted when the outer end of the plunger member is impacted.

16. The fluid control valve of claim 15, wherein the fluid control valve further comprises an upper stopping member, which is mounted to the valve body above the fluid chamber, such that the upper stopping member is configured to stop an upward motion of the plunger member, when the plunger member is in a maximum upward position.

17. The fluid control valve of claim 16, wherein the plunger member further comprises:
a) an upper plunger part, which protrudes upward;
b) a lower plunger part, which protrudes downward; and
c) a central plunger part, which is mounted between the upper plunger part and the lower plunger part, such that the central plunger part protrudes laterally;
wherein the upper stopping member further comprises a central aperture, such that the upper plunger part protrudes through the central aperture;
such that the central plunger part contacts with the upper stopping member, when the plunger member is in the maximum upward position.

18. The fluid control valve of claim 16, wherein an upper portion of the valve body comprises a threaded aperture and an outer side of the upper stopping member comprises a threading, such that the upper stopping member is screwed into the threaded aperture, such that a position of the upper stopping member is adjustable, whereby the maximum upward position of the plunger member is adjustable.

19. The fluid control valve of claim 15, wherein the fluid control valve further comprises a plunger spring, which is mounted to the valve body above the fluid chamber, such that the plunger spring is configured to cause an upward return motion of the plunger member after the plunger member has reached the lowest position.

20. The fluid control valve of claim 19, wherein the plunger member further comprises:
a) an upper plunger part, which protrudes upward;
b) a lower plunger part, which protrudes downward; and
c) a central plunger part, which is mounted between the upper plunger part and the lower plunger part, such that the central plunger part protrudes laterally;
wherein the plunger spring further comprises a spring aperture, such that the lower plunger part protrudes through the spring aperture;
such that the central plunger part compresses the plunger spring, when the plunger member moves downward.

21. The fluid control valve of claim 20, wherein the plunger spring is configured as a cone-shaped disc spring.

22. The fluid control valve of claim 20, wherein the fluid control valve further comprises a plunger retainer, comprising a plunger retainer aperture; such that the plunger retainer is mounted inside the valve body below the plunger spring;
such that the lower plunger part protrudes through the plunger retainer aperture;
such that the plunger spring is mounted between the central plunger part and the plunger retainer.

23. The fluid control valve of claim 22, wherein a central portion of the valve body comprises a threaded aperture and an outer side of the plunger retainer comprises a threading, such that the plunger retainer is screwed into the threaded aperture, such that a vertical position of the plunger retainer is adjustable.

24. A fluid control valve, comprising:
a) a valve body, which comprises:
   a fluid chamber in an interior of the valve body; and
   an outlet aperture, which is in fluid contact with the fluid chamber;
b) a fluid supply line, which is connected to the valve body, such that the fluid supply line is in fluid contact with the fluid chamber;
   such that the fluid supply line is configured to be connectable to a fluid reservoir, which contains a fluid, which is pressurized, such that the fluid reservoir is in fluid contact with the fluid supply line;
c) a plunger member, which is mounted to the valve body, such that the plunger member penetrates into the valve body, such that an outer end of the plunger member is exposed on an outer surface of the valve body; and
d) an upper stopping member, which is mounted to the valve body above the fluid chamber, such that the upper stopping member is configured to stop an upward motion of the plunger member, when the plunger member is in a maximum upward position,
   wherein an upper portion of the valve body comprises a threaded aperture and an outer side of the upper stopping member comprises a threading, such that the upper stopping member is screwed into the threaded aperture, such that a position of the upper stopping member is adjustable, whereby the maximum upward position of the plunger member is adjustable;
such that the fluid control valve is configured to allow the fluid to flow in a flow from the fluid supply line into the fluid chamber and out via the outlet aperture;
wherein the plunger member is configured to move toward the outlet aperture when the outer end of the plunger member is impacted, such that an inner end of the plunger member blocks the outlet aperture, when the plunger member is in a lowest position after the plunger member is impacted;
whereby the flow of the fluid is interrupted when the outer end of the plunger member is impacted.

25. A fluid control valve, comprising:
a) a valve body, which comprises:
   a fluid chamber in an interior of the valve body; and
   an outlet aperture, which is in fluid contact with the fluid chamber;
b) a fluid supply line, which is connected to the valve body, such that the fluid supply line is in fluid contact with the fluid chamber;
   such that the fluid supply line is configured to be connectable to a fluid reservoir, which contains a fluid, which is pressurized, such that the fluid reservoir is in fluid contact with the fluid supply line;
c) a plunger member, which is mounted to the valve body, such that the plunger member penetrates into the valve body, such that an outer end of the plunger member is exposed on an outer surface of the valve body, wherein the plunger member further comprises:
   an upper plunger part, which protrudes upward;
   a lower plunger part, which protrudes downward; and
   a central plunger part, which is mounted between the upper plunger part and the lower plunger part, such that the central plunger part protrudes laterally; and
d) a plunger spring, which is mounted to the valve body above the fluid chamber, such that the plunger spring is configured to cause an upward return motion of the plunger member after the plunger member has reached the lowest position,
   wherein the plunger spring further comprises a spring aperture, such that the lower plunger part protrudes through the spring aperture, such that the central plunger part compresses the plunger spring, when the plunger member moves downward;
such that the fluid control valve is configured to allow the fluid to flow in a flow from the fluid supply line into the fluid chamber and out via the outlet aperture;
wherein the plunger member is configured to move toward the outlet aperture when the outer end of the plunger member is impacted, such that an inner end of the plunger member blocks the outlet aperture, when the plunger member is in a lowest position after the plunger member is impacted;
whereby the flow of the fluid is interrupted when the outer end of the plunger member is impacted.

26. The fluid control valve of claim 25, wherein the plunger spring is configured as a cone-shaped disc spring.

* * * * *